(12) United States Patent
Vranish

(10) Patent No.: US 7,601,091 B2
(45) Date of Patent: Oct. 13, 2009

(54) MODULAR GEAR BEARINGS

(75) Inventor: John M. Vranish, Crofton, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 389 days.

(21) Appl. No.: 11/426,134

(22) Filed: Jun. 23, 2006

(65) Prior Publication Data

US 2008/0045375 A1 Feb. 21, 2008

(51) Int. Cl.
*F16H 55/18* (2006.01)
(52) U.S. Cl. ...................... 475/335; 475/347
(58) Field of Classification Search ............ 475/183, 475/334, 335, 344; 192/206, 207
See application file for complete search history.

(56) References Cited

U.S. PATENT DOCUMENTS

| 6,022,287 A | 2/2000 | Klemen et al. |
| 6,626,792 B2 | 9/2003 | Vranish |
| 2004/0154422 A1* | 8/2004 | Menjak et al. ................ 74/440 |

* cited by examiner

*Primary Examiner*—Sherry L Estremsky
*Assistant Examiner*—Edwin A. Young
(74) *Attorney, Agent, or Firm*—Matthew F. Johnston

(57) ABSTRACT

A gearing system using modular gear bearing components. Each component is composed of a core, one or more modules attached to the core and two or more fastening modules rigidly attaching the modules to the core. The modules, which are attached to the core, may consist of gears, rollers or gear bearing components. The core orientation affects the orientation of the modules attached to the core. This is achieved via the keying arrangement of the core and the component modules that attach to the core. Such an arrangement will also facilitate the phase tuning of gear modules with respect to the core and other gear modules attached to the core.

17 Claims, 13 Drawing Sheets

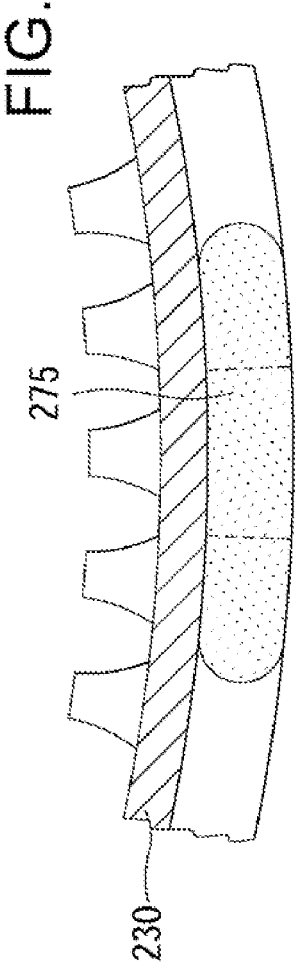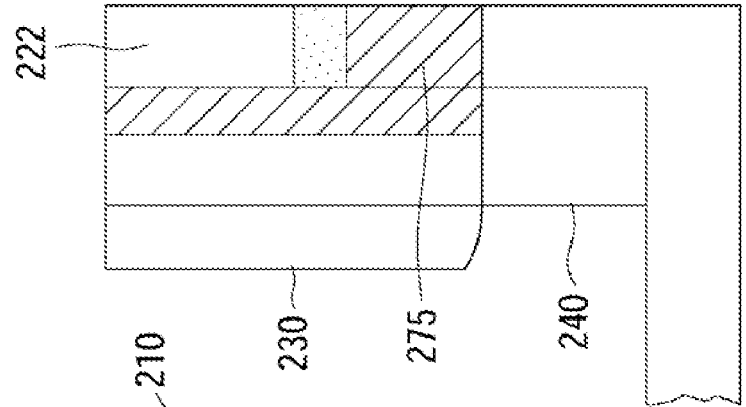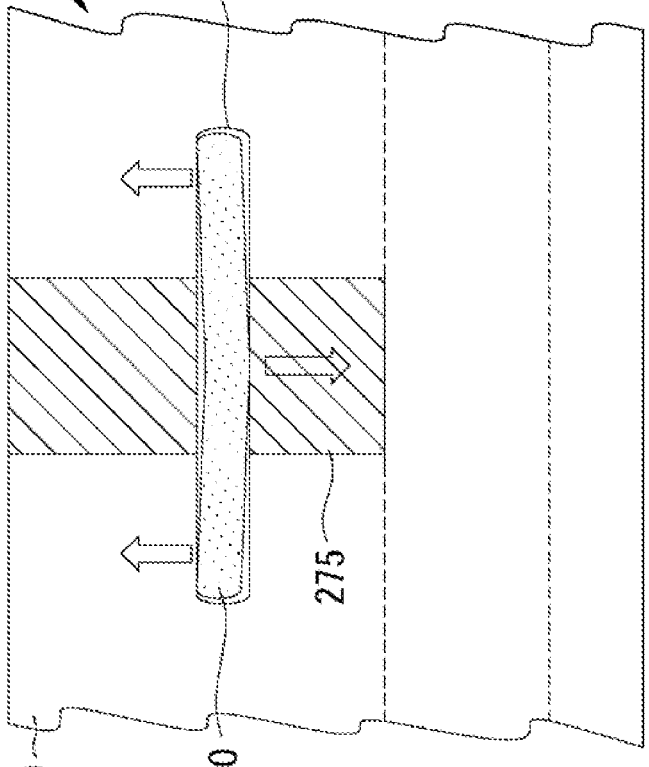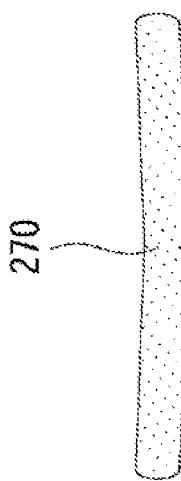

MODULAR GEAR BEARINGS

ORIGIN OF THE INVENTION

The invention described herein was made by employees of the United States Government, and may be manufactured and used by or for the Government for governmental purposes without the payment of any royalties thereon or therefor.

CROSS REFERENCE TO RELATED PATENTS

The present invention is related to inventions shown and described in:
- U.S. Pat. No. 6,626,792, entitled, "GEAR BEARINGS", filed on Mar. 3, 2001;
- U.S. patent application Ser. No. 10/789,031, entitled "PARTIAL TOOTH GEAR BEARING", filed on Feb. 26, 2004;
- U.S. patent application Ser. No. 11/122,201, entitled "ANTI-BACKLASH GEAR BEARING", tiled on May 2, 2005; and,
- U.S. patent application Ser. No. 11/076,100, entitled "PHASE ORIENTED GEARS", filed on Feb. 7, 2005

The above-noted related patent and patent applications are assigned to the assignee of the present invention. The related patent and patent applications are herein incorporated by reference in their entirety.

BACKGROUND OF THE INVENTION

1. Field of the Invention

The invention relates generally to a single component that is capable of performing both gear and bearing functions. More particularly, the invention relates to a modular design incorporating gear bearings so as to facilitate ease of manufacture and assembly, disassembly and repair of gear bearing components.

2. Background Description

Gearing systems generally are well known. The manufacture and assembly of gearing systems is often a time consuming and expensive process. This is particularly true for gearing systems that are assembled for use in mechanical actuators and vehicular transmissions. Such gearing systems may include a planetary gearing arrangement. A typical planetary gearing arrangement might include an inner gear member and an outer gear member, each of which engages a plurality of planet gear members. Typically an input member is operatively connected to one of the gear members in the planetary gear set with means provided to operatively connect a power output member to another of the gear members in the planetary gear set. The manufacture and assembly of such an arrangement can be challenging, especially in light of the different components that may be necessary to create a planetary gearing system for a mechanical actuator or a vehicular transmission. There have been technological advances to reduce the number of components needed for such gearing arrangements. One technological advance is combining the gearing and bearing functions in one component thereby reducing the number of components necessary for a planetary drive gearing arrangement. Using gear bearing components result in a smaller and simpler design that is easier to assemble compared to existing ball bearing designs.

While various gearing systems may seek to simplify gearing arrangements so as to provide for a more simplistic design, many such systems are still very complicated, expensive and time consuming to assemble or disassemble. Consequently, some planetary gearing arrangements are not widely used. Thus, there has been a long felt need for an innovation that can make virtually any gearing arrangement practical to manufacture, assemble and disassemble. There is a need to provide a planetary gearing arrangement that is more economically feasible to manufacture and maintain.

SUMMARY OF THE INVENTION

Embodiments of the present invention generally are directed to an improved gearing arrangement that may facilitate ease of manufacture, assembly and disassembly. A gear bearing module may be comprised of a core module having a cutout portion; at least one roller module having a cutout portion; at least one gear module; and, a fastening module inserted into the cutout portion of at least one roller module and the core module so as to fix at least one roller module and at least one gear module to the core module.

Accordingly, embodiments of the present invention may provide for a modular gearing system that uses gear bearing components to simplify the gearing arrangement.

Embodiments of the present invention may also provide for a modular gear bearing system that facilitates easier phase tuning of gear bearing components.

Additionally, embodiments of the present invention further may provide for a gear bearing system that is versatile.

In one embodiment, modular gear bearing components may include a core, one or more modules attached to the core and two or more fastening modules rigidly and releasably attaching the modules to the core. The modules, which are attached to the core, may consist of gears, rollers or gear bearing components. The core orientation affects the orientation of the modules attached to the core. This is achieved via the keying arrangement of the core and the component modules that attach to the core. Such an arrangement may also facilitate the phase tuning of gear modules with respect to the core and other gear modules.

In another embodiment, an internal ring gear bearing module is provided. An internal ring gear may include a gear frame that may consist of internal gear teeth and a roller race. For the internal ring gear, the frame serves the same function as the core in a typical modular gear bearing arrangement. The frame includes a cutout portion or throughway that receives a reaction tab for reacting a fastening means against the frame and internal ring gear.

By way of example, an epicyclical differential planetary gearing arrangement may be used to illustrate an embodiment of the present invention. This particular arrangement may include an output stage roller, an output stage external gear, an input stage roller and an input stage external gear. A fastening module may attach or fix the modules to the core and to each other. The fastening module may be of a spring fastener, spring clip or fastener clip type of fastener so as to spring bias the modules to the core and each other to form one unit. The fastening module alternately may comprise other types of fasteners known to one of skill in the art. The fastening module may also torque react the module against the core. The fastening module may fit into a slit in the modules, although one may employ any suitable means to attach the fastening module to the modules and the core. The fastening module may bias the modules against the core in the axial and radial directions while spring loading the modules against each other to form a tight, functional, gear bearing module. One may create various types of gear bearing modules in this manner. Thus, an entire epicyclical differential planetary gear bearing system may be created using modular gear bearings. The aforesaid embodiments are described without attempting to show all of the various modifications in which the present

BRIEF DESCRIPTION OF THE DRAWINGS

FIG. 5a shows a modular internal ring gear bearing component.

FIG. 5b. shows the fastening module for the modular internal ring gear bearing component shown in FIG. 5a.

FIG. 5c shows a side sectional view of FIG. 5a.

FIG. 5d shows a top sectional view of FIG. 5a

FIG. 7b shows a side view of FIG. 7a.

FIG. 12b shows a side sectional view of FIG. 12a.

FIG. 13b shows a side view of FIG. 13a.

DETAILED DESCRIPTION

One representative form of a modular planetary gearing system that may be assembled in accordance with the concepts of the present invention is illustrated in FIGS. 1 through 13. With particular reference to FIGS. 1 through 13 it will be observed by those skilled in the art that embodiments of the present invention provide a unique modular design that will allow for easy manufacture, assembly and disassembly. The gearing system may include at least a core module, a gear bearing component or roller module, and two or more fastening modules for releasably attaching the gear bearing component or roller modules to the core. This gearing system or gear bearing module may then be connected with other gear bearing modules to form a complete modular gearing system. Such an arrangement greatly simplifies the assembly and disassembly of gearing systems.

Figure 1:
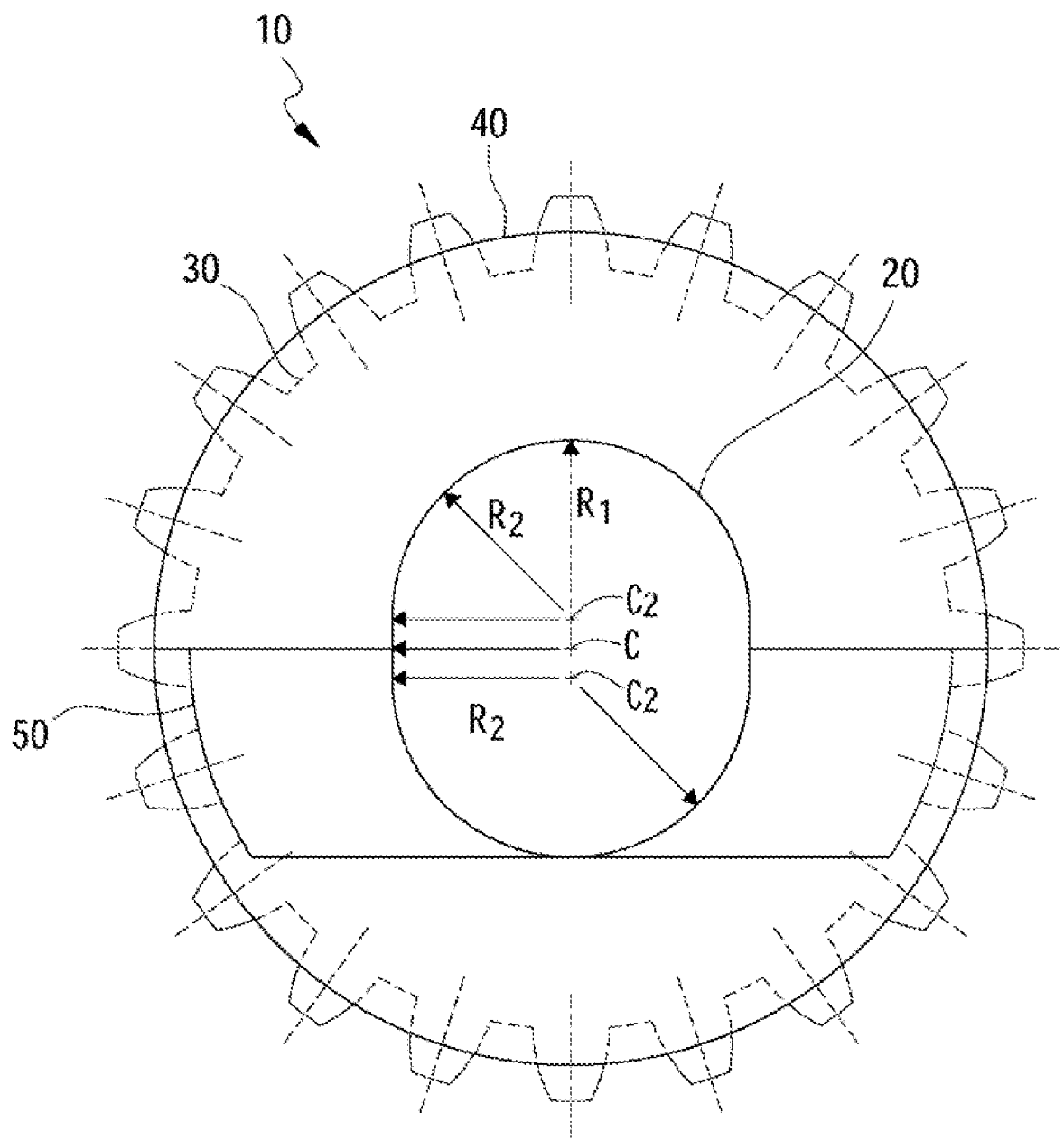
FIG. 1 shows a top view of a typical modular external gear bearing

FIG. 1 shows a top view of a modular external gear bearing generally designated as 10. The modular gear bearing 10 includes a core module 20 a gear module 30 a roller module 40 and a fastening module 50. Core module 20 may be manufactured from common bar stock or any material suitable for the particular use. The core module 20 may include a particular keyhole shape or form that runs the length of the module. For purposes of illustrating the present invention, the keyhole form includes a first radius $R_1$ and a second radius $R_2$ thereby forming a biaxial core. First radius $R_1$ is the distance measured along the longitudinal axis from the center C to the edge of keyhole form. Second radius $R_2$ is the distance measured along the transverse axis from the center C to the edge of the keyhole form of core module 20. When measured from the longitudinal axis, $R_2$ spans from a point $C_2$ along the longitudinal axis of the keyhole form of core module 20. This particular keyhole form of core module 20 facilitates the phase tuning of gear modules with respect to other gear modules.

Figure 2A:
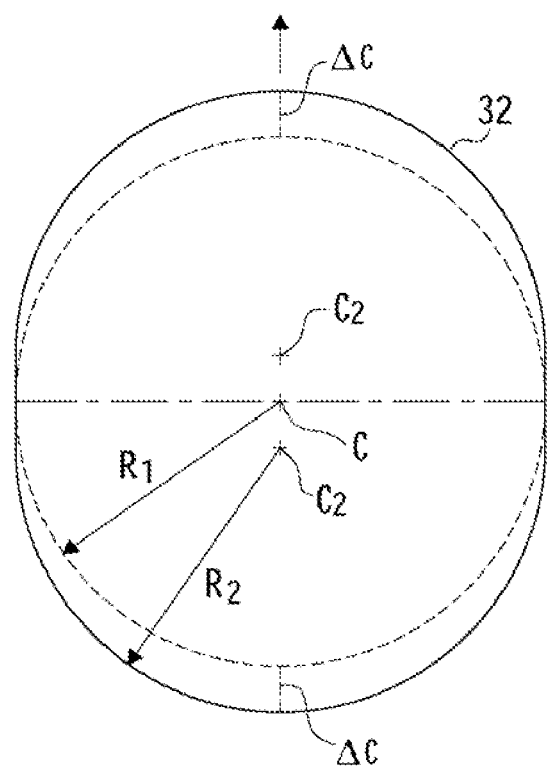
FIG. 2a shows a top view of the core of a modular gear bearing unit.
Figure 2B:
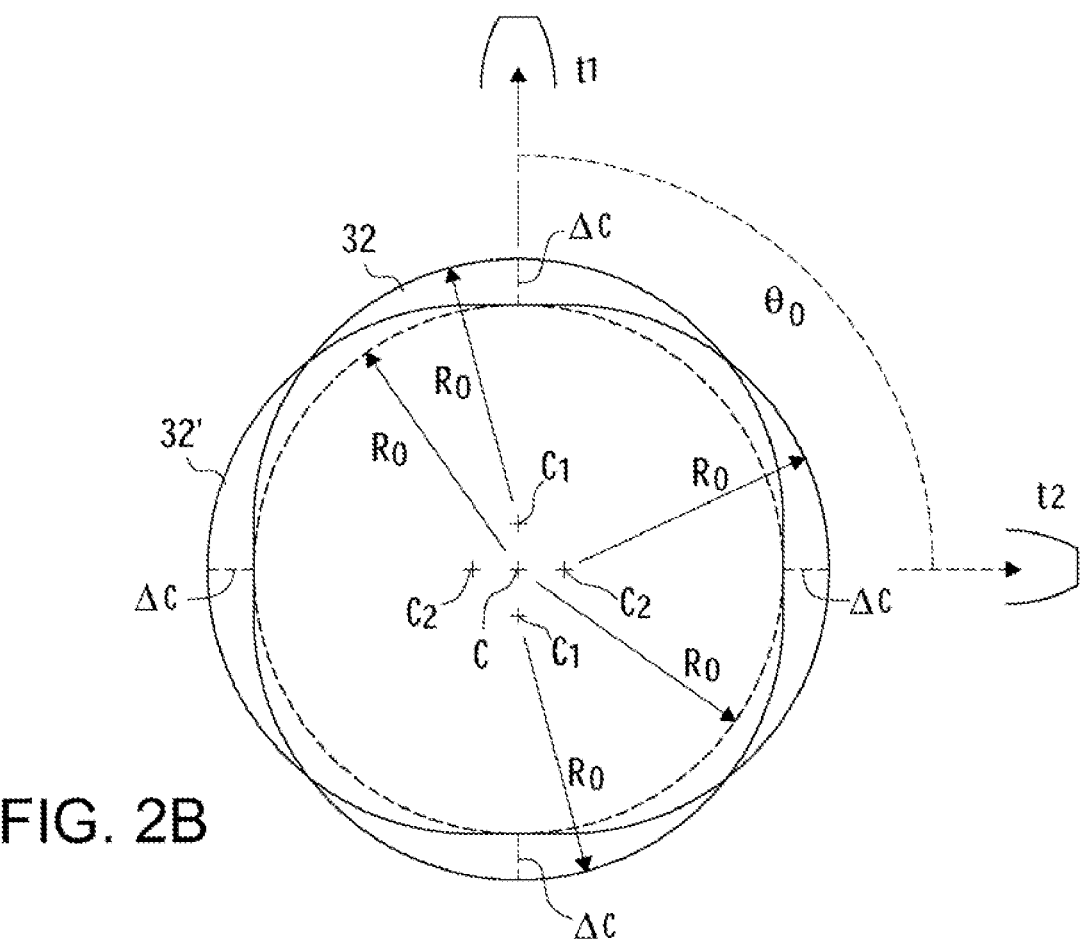
FIG. 2b shows the relationship between the gear tooth phase and the orientation of the keyhole.

FIGS. 2a and 2b show greater detail of the keyhole form of biaxial core module 20 and the gear tooth phase tuning, which will now be discussed. FIG. 2a shows radius $R_1$ with corresponding center C. $R_1$ and C represent the radius and center point for the initial hole drilled when making keyhole 32 in a gear module 30. Once this initial hole is drilled, a second hole is drilled at center point $C_2$ a distance $\Delta C$ from center point C along longitudinal axis $C_2$-$C_2$ of keyhole 32. Next a third hole may be drilled along longitudinal axis $C_2$-$C_2$ but on the opposite side of center point $C_1$ of the second drilled hole. The third hole also has a center point $C_2$ and is also located a distance $\Delta C$ from center point C. Thus the distance between center points $C_2$ measured along longitudinal axis $C_2$-$C_2$ is $2\Delta C$. Once the three holes are drilled, the sides of keyhole 32 are machined to be made flush and parallel to longitudinal axis $C_2$-$C_2$. The portion along the edge of keyhole 32, which is parallel to longitudinal axis $C_2$-$C_2$, extends a distance $2\Delta C$ along the edge of keyhole 32. Center point C is midway between center points $C_2$ and represents the center of keyhole 32. The distance between $R_1$ and $R_2$ measured along longitudinal axis $C_2$-$C_2$ is $\Delta C$. FIG. 2b shows keyhole 32 superimposed on itself and rotated 90 degrees (keyhole 32). When phase tuning gear teeth $t_1$ of a gear module 30, gear tooth $t_1$, which is located along longitudinal axis $C_2$-$C_2$, is rotated an angle $\theta_0$ until the desire phase shift is reached. Gear tooth $t_1$ may be rotated up to 90 degrees to the position of gear tooth $t_2$ at which point the phase angle would be back to 0 degrees. This type of phase tuning may easily be achieved by properly orienting the keyhole 32 of the gear module 30. The keyhole of roller module 40 may be drilled and machined in the same fashion as keyhole 32 of gear module 30. Thus the angle of the longitudinal axis of the keyhole of the gear module can determine the angle of phase tuning or shifting of the gear tooth $t_1$. Naturally, each gear module 30 may be phase tuned to meet any design requirement.

Figure 3:
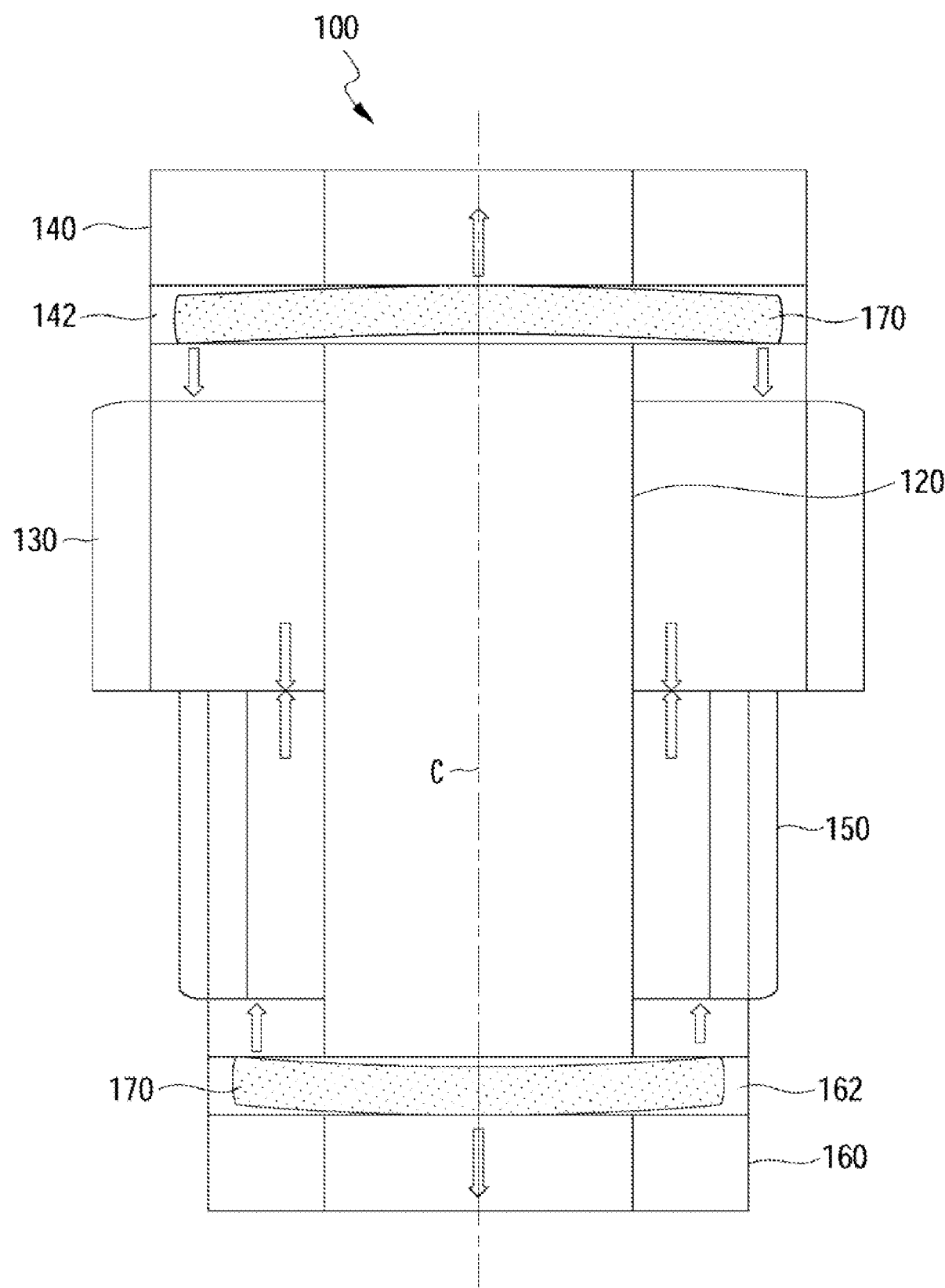
FIG. 3 shows a cross-sectional view showing an entire modular gear bearing planet component typical of an epicyclical differential gearing arrangement.

FIG. 3 shows a side sectional view of a modular gear bearing 100 typical of an epicyclical differential planetary gearing arrangement. Modular gear bearing 100 may include core module 120, an output stage external gear module 130, an output stage roller module 140, an input stage external gear module 150, an input stage roller module 160 and a fastening module 170. Core module 120 may be fashioned in the same manner as core module 20. Core module 120 may be of a keyhole form that is designed to mate with the keyhole of the other modular components. The keyhole arrangement (not shown) of gear bearing module 100 facilitates any desired phase tuning of gear modules 130 and 150. Roller modules 140 and 160 may also include a keyhole (not shown) that is fashioned in the same manner as the keyhole for the gear modules 130 and 150. Roller modules 140 and 160 may further include slits or cutout portions 142 and 162 respectively. Slits 142 and 162 may be designed to receive fastening module 170. Fastening module 170 may fit snugly in slits 142 and 162 so as to spring bias roller modules 140 and 160 against each other. Because roller modules 140 and 160 are spring biased in opposing directions, gear modules 130 and 150 are also spring biased against each other. Fastening modules 170 may also releasably secure attach roller module 140 and 160 to core module 120. This arrangement creates a gear bearing module 100 that consist of several modular components but functions as one unit.

Figure 4:
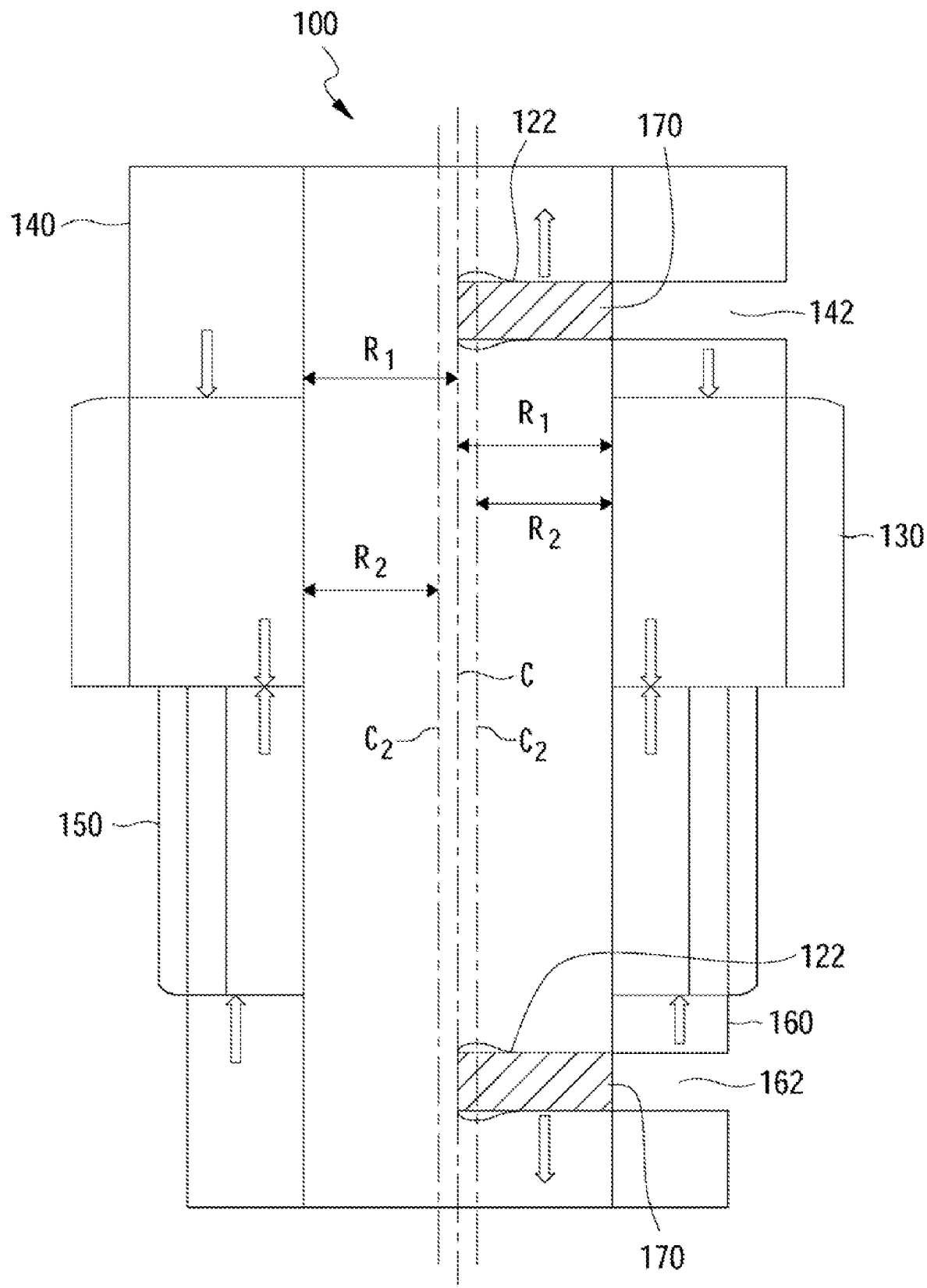
FIG. 4 shows a sectional view of the gear bearing arrangement shown in FIG. 3.

FIG. 4 is a side sectional view of FIG. 3. Gear bearing module 100 is illustrated so as to show how fastening modules 170 interact with roller modules 140, 160 and core module 120. Core module 120 may also include slits 122 to receive fastening module 170 so as to facilitate the attachment of roller modules 140 and 160 to core module 120. Fastening modules 170 may be a flat spring that has a high region in the center of one of its surfaces and high region on an opposite surface located at both ends of the fastening module. Slits 122 may extend to center point C of core module 122. As can be observed in FIG. 1, fastening module 170 may also extend across the slits 142 and 162 of roller modules 140 and 160 respectively so as to further facilitate a secure connection between core module 120 and roller modules 140 and 160. Roller modules 140 and 160 may be spring biased against gear modules 130 and 150 via the spring action of fastening module 170. Fastening module 170 may also torque react roller modules 140 and 160 against core module 120. FIG. 4 illustrates the reaction forces between roller and gear module components for the displayed embodiment. Because of the spring bias action of fastening modules 170 we observe that roller module 140 reacts against gear module 130. As a result of this reaction force, gear module 130 reacts against roller module 150. Likewise, gear module 150 reacts against roller module 160. This chain reaction of force is repeated in the opposite direction as a result of the fastening module 170 positioned in slit 162 of roller module 160. This arrangement creates a secure connection between modular components thereby creating a single modular gear bearing unit.

FIGS. 5a through 5c show an alternate embodiment of the present invention illustrated as an internal ring gear. The modular internal ring gear bearing, generally shown as 210 may include a frame module 220, an internal gear module 230 and a roller race module 240. Internal gear module 230 and reaction tab 275 may be integrally formed or otherwise connected. The means by which these components are attached is a matter of design choice for one skilled in the art. Thus, in FIG. 5a we observe reaction tab 275 in throughway 222 of frame module 220 thereby locating internal gear module 230 with respect to frame module 220. Frame module 220 may serve the same function as the core module 120 of FIGS. 3 and 4. The frame module 220 includes a frame throughway 222 for receiving fastening module 270 and reaction tab 275 which may be secured to frame module 220 via any suitable means. Fastening module 270 may function primarily in the same fashion as fastening module 170 of FIGS. 3 and 4. The spring action of fastening module 270 biases reaction tab 275 against frame module 220. Fastening module 270 may also bias internal gear module 230 against roller race module 240. The reaction forces illustrated in FIG. 5a facilitate a connection between component modules so as to create a single modular internal ring gear bearing unit 210. In instances where the frame module does not trap the roller module in place as shown in FIG. 5c, fastening modules may be used to fix the roller race module in place. FIG. 5c shows a side sectional view of FIG. 5a. The interaction between fastening module 270, reaction tab 275, internal gear module 230 and roller race module 240 are illustrated. FIG. 5d is a top view of FIG. 5a showing the internal gear module 230 and fastening module 270 and a hidden view of reaction tab 275.

Figure 6:
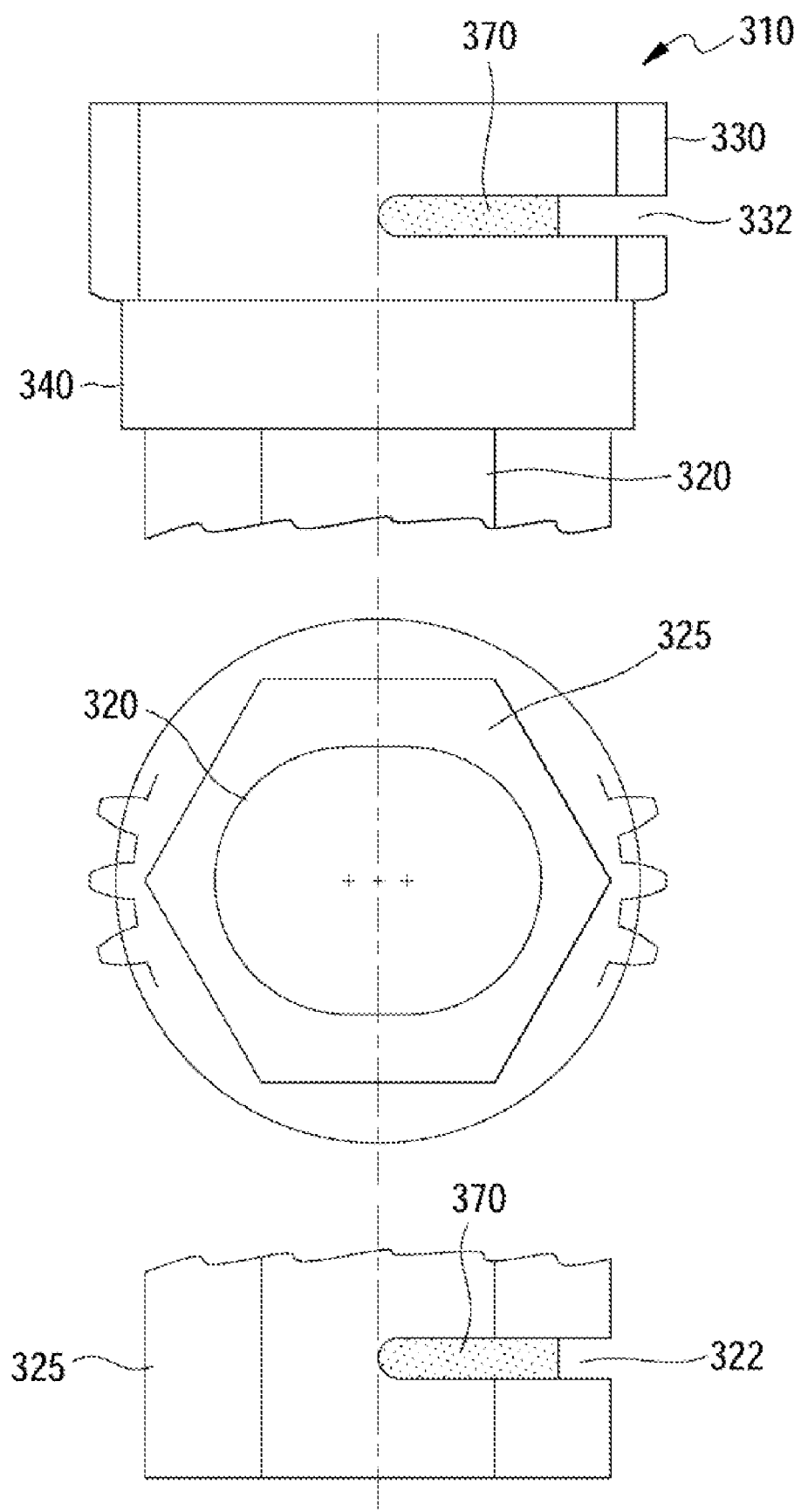
FIG. 6 shows a sun gear bearing planet module that includes a top and cut-away side views.

FIG. 6 shows another alternate embodiment illustrated as a sun gear bearing module. The sun gear bearing module generally shown as 310 may include a core module 320, a hexagonal drive 325, a sun gear module 330, roller module 340 and fastening modules 370. A cutout portion or slit 332 may be provided in sun gear module 330 to receive a fastening module 370. The bottom portion of core module 320 is shown without a sun gear module or roller module attached thereto so as to illustrate the slit 322 or core module 320 for receiving a fastening 370. Fastening module 370 may fit snugly in slits 332 and 322 so as to securely attach sun gear module 330 to core module 320. Fastening module 370 may also spring bias sun gear module 330 against roller module 340.

Figure 7A:
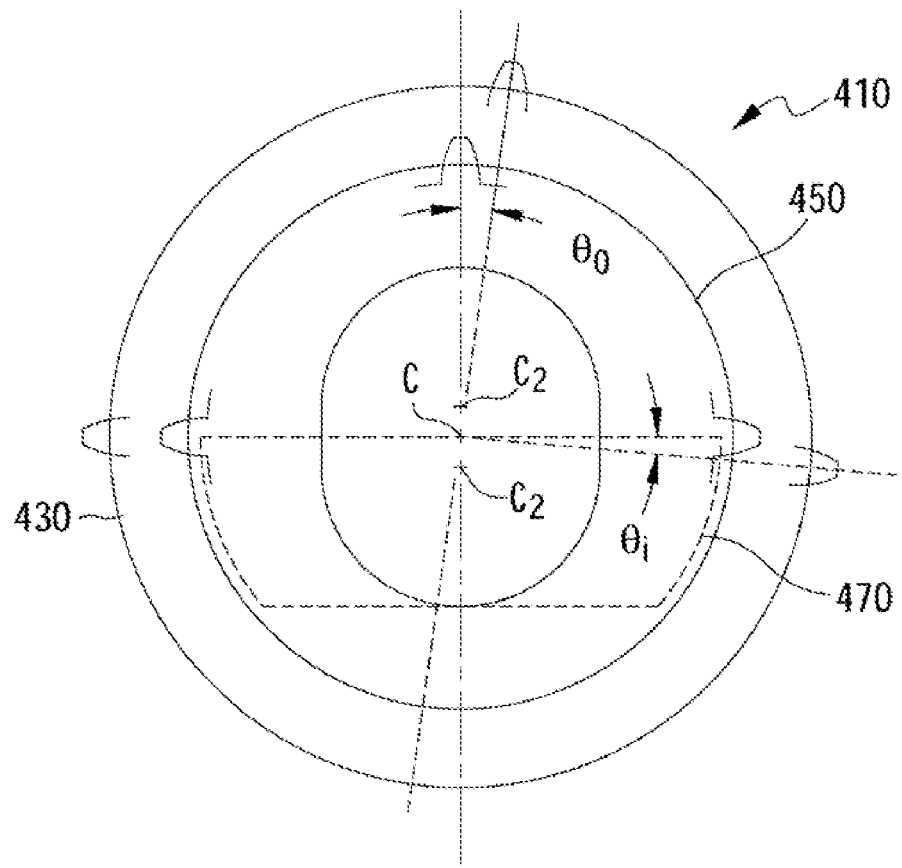
FIG. 7a shows a top view of a gear bearing planet module wherein two gears are phase shifted.
Figure 7B:
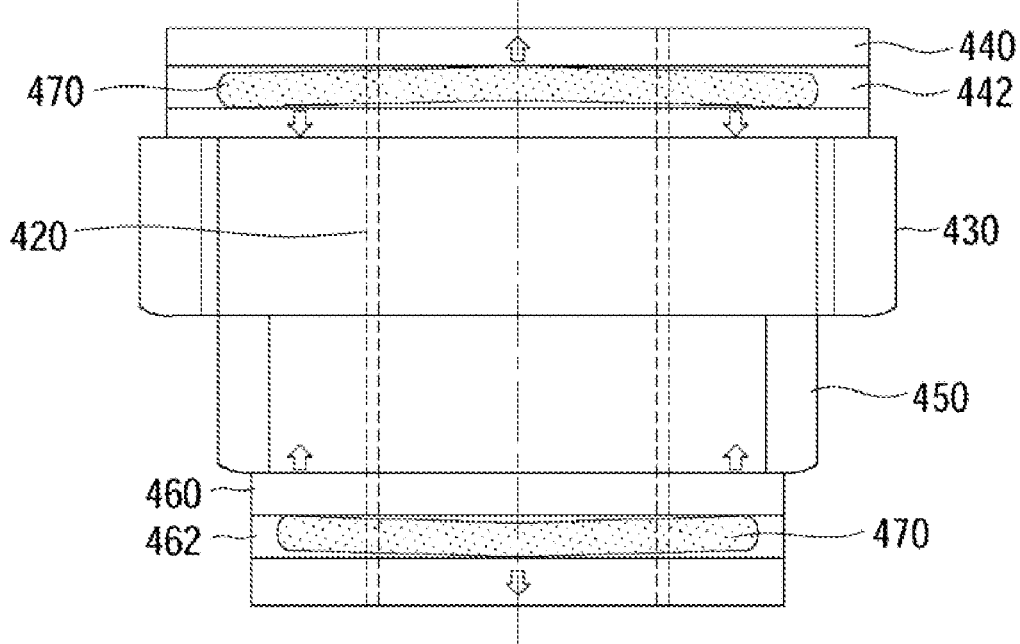

Details of the assembly and function of the External Gear modules will now be discussed. FIG. 7 shows an external gear bearing module generally as 410. External gear bearing module 410 may include output roller module 440, output gear module 430, input gear module 450 and input roller module 460. Roller module 440 and 460 may include cutout portions or slits 442 and 462 respectively. The external gear modules 330 and 350 may share the same core module 420. Core module 420 may be fashioned in the same manner as the core module 20 shown in FIG. 1. Thus gear teeth of external gear modules 430 and 450 can be phase shifted with respect to each other. In epicyclical differential planetary transmissions, a controlled phase shift can be used in assembling very high-speed reduction devices. The shape of core module 420 (formed as a biaxial core rod) may facilitate gear tooth phase shifting or tuning. This is because the roller and gear modules, which fit over the biaxial core, may come, in bar stock form, with a single hole down the center of each. This hole has a center C and the same radius ($R_1=R_2$) as each of the two (2) biaxial core rod cylindrical surfaces. Thus, a milling tool of the same diameter can be inserted into roller bar stock or gear bar stock center and dithered back and forth a distance $+\Delta C$ and $-\Delta C$ (see to FIG. 2a) the distance of each biaxial center from the common rod center. This creates a keyed female module, which will fit on the biaxial core module. This arrangement allows the keyhole to be uniquely located in its phase angle with respect to the biaxial core rod. As shown in FIG. 2a, this dither can be easily directionally applied to fine-tune the phase orientation of the gear module teeth with respect to the core and with respect to any gear module that shares the same core module. Thus the gear module of the embodiment of FIG. 7 can easily and economically be phase-tune on a planet-by-planet basis.

Figure 8A:
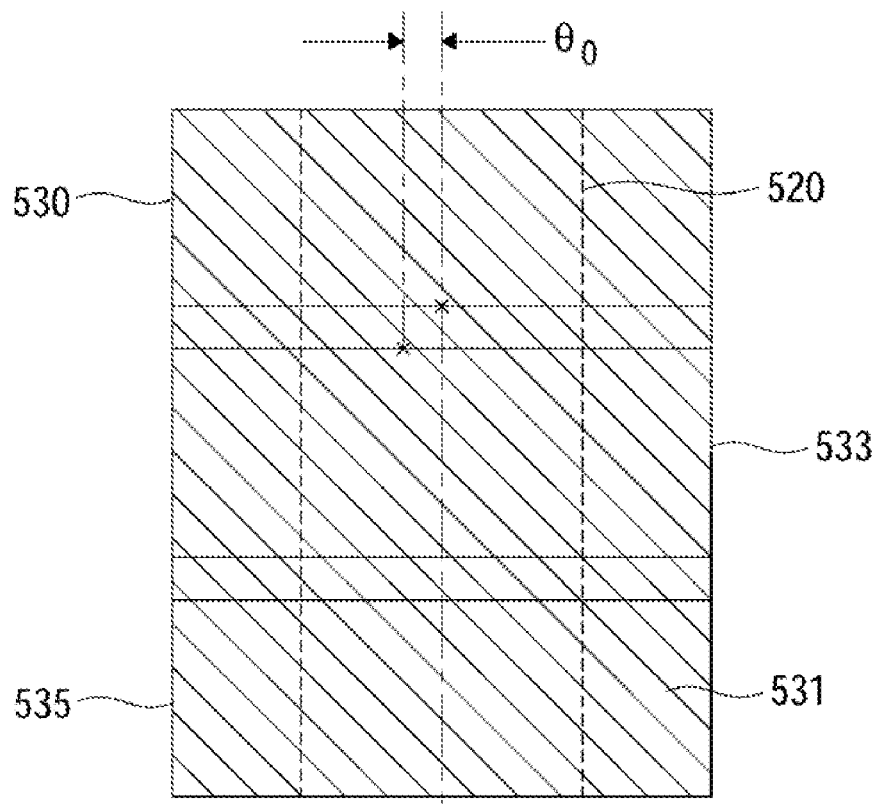
FIG. 8a shows a gear bearing planet module that includes helical gears.
Figure 8B:
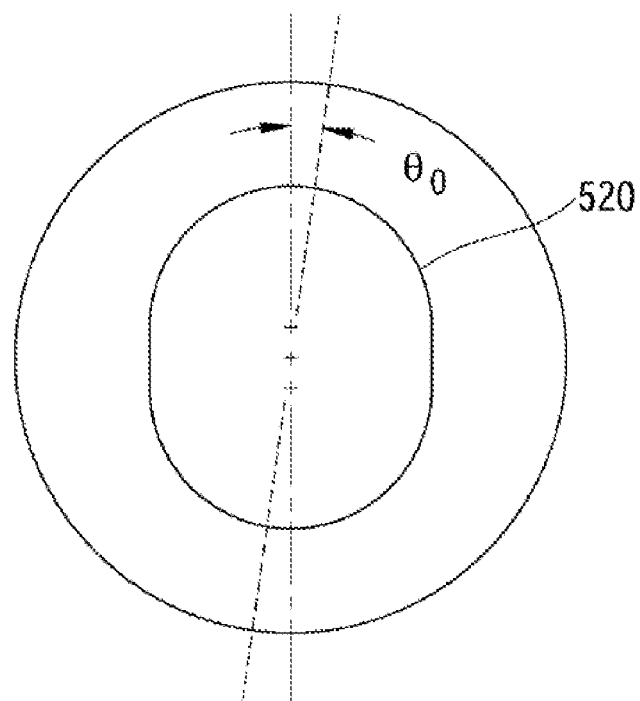
FIG. 8b shows a top view of FIG. 8a indicating a phase angle $\theta_0$.

FIGS. 8a and 8b show a helical gear bearing module generally designated as 510. The helical gear bearing module may include a core module 520, helical gear modules 530, 533 and 535. As can be seen in FIGS. 8a and 8b, helical gear teeth 531 change in phase with respect to their keyed angular orientation along the gear axial length. FIGS. 8a and 8b also show that this phase shift is periodic. That is, if we have a tooth phase of zero, at one point on the gear axis, proceeding further down the axis, will initially, create an increasing phase from zero until it reaches 180 degrees out of phase. Proceeding further down the axis, the phase shift returns to zero again in a periodic pattern. If a manufacturer is using helical gear bar stock, phase errors can be introduced according to the cut location and width.

Figure 9:
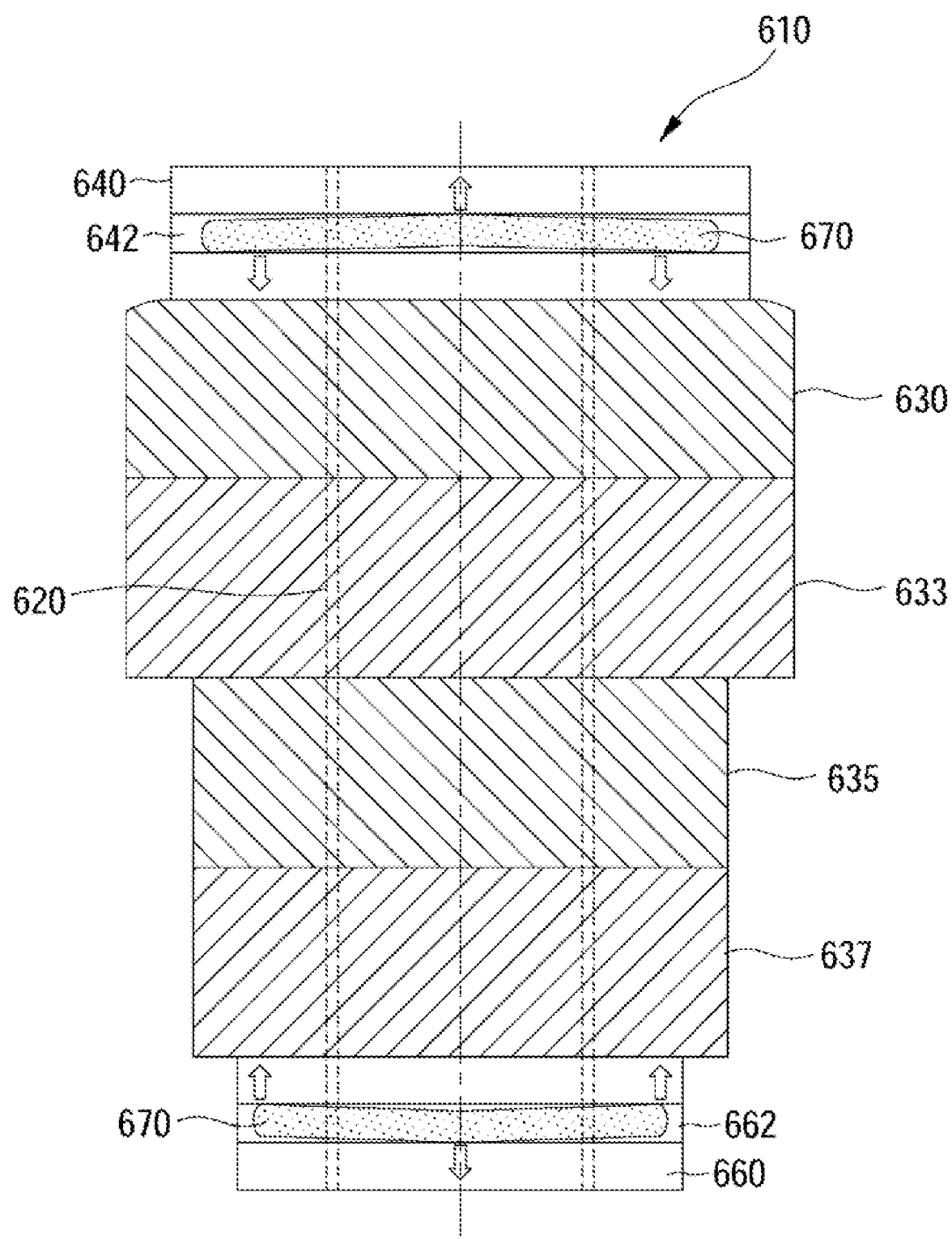
FIG. 9 shows a gear bearing planet that includes herringbone gears.

FIG. 9 illustrates the case of a herringbone gear module generally designated as 610. Modular herringbone gear bearing 610 may include a core 620 upper roller module 640, lower roller module 660, herringbone gear modules 630, 633, 635 and 637 and fastening modules 670. Roller modules 640 and 660 include cutout portions or slits 642 and 662 respectively. The ease with which helical gear forms can be tuned, aligned and assembled using modular gear bearings techniques suggests that herringbone forms can be constructed from helical bar stock. In this approach, one of each helical module pairs may be flipped over, placed on the other along the same axis (probably using a simple external fixture common to both) and phase tuned using the same technique described for the external gear case shown in FIG. 6.

Figure 10:
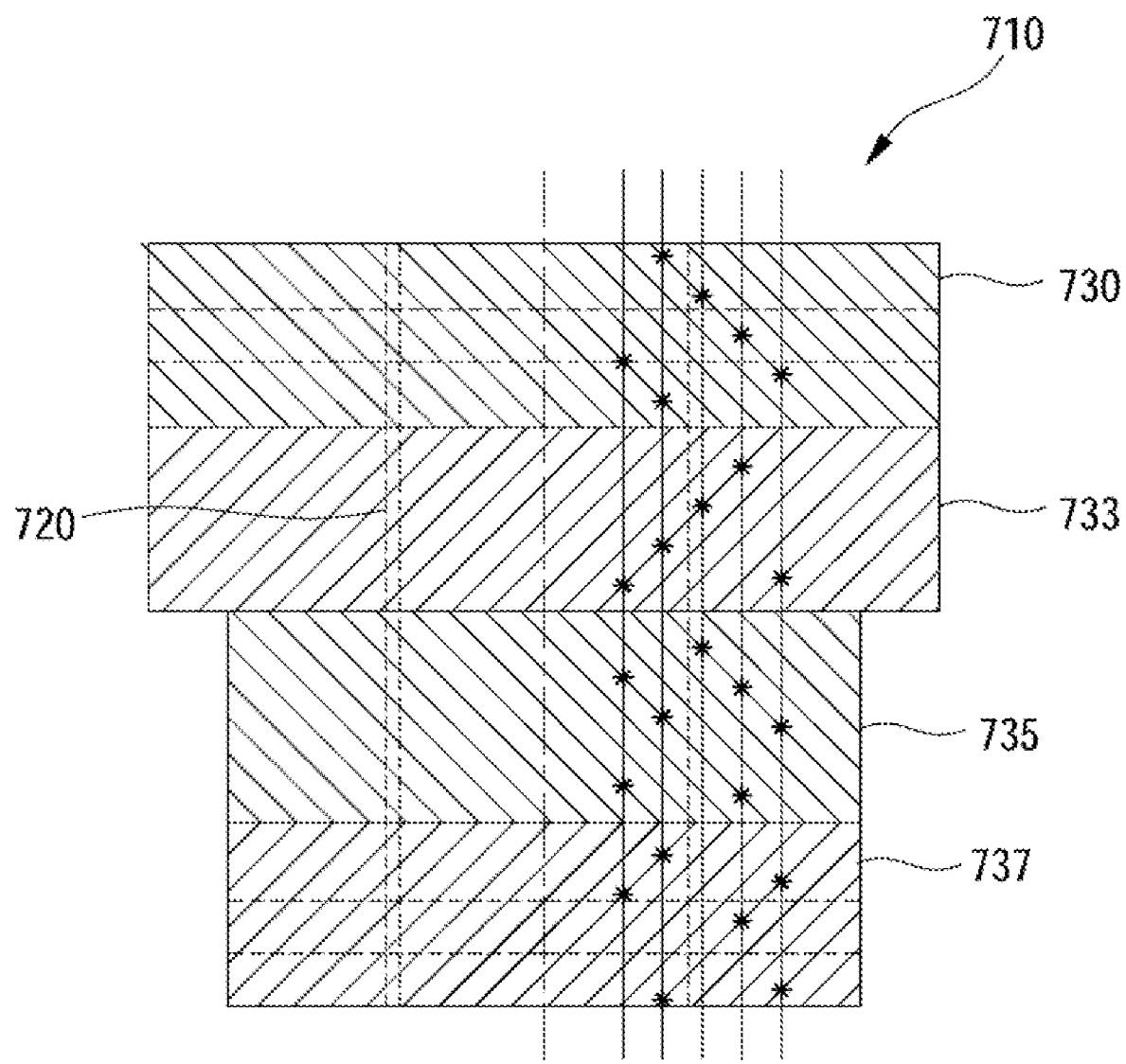
FIG. 10 shows a gear bearing planet module that includes half tooth gears.

The ease and effectiveness with which helical and herringbone gear forms can be implemented using the modular gear bearing approach suggests, helical half tooth gear bearing components can be used to eliminate the need for roller modules. The half tooth gear bearing module shown in FIG. 10 is generally designated as 710. The half tooth gear bearing module may include core module 720 half tooth gear modules 730, 733, 735 and 737. Hidden lines shown in half tooth gear modules 730 and 737 illustrate the cutout portion for receiving fastening modules (not show) so as to secure the modules to the module core 720. Each half tooth gear module on a planet may include one module with addendum half gear teeth, alternating with roller sections (located at the gear involute radius) axially placed above another module with dedendum half gear teeth, alternated with roller sections (also located at the common involute radius). These modules may be phase tuned with respect to each other such that roller sections and gear half teeth sections are exactly out of phase at their interface. This approach may be followed for both the input and output stages of the planetary gear bearing. It should be noted that this geometry provides continuous maximal roller contacts and complete gear tooth action throughout the mesh process.

Figure 11:
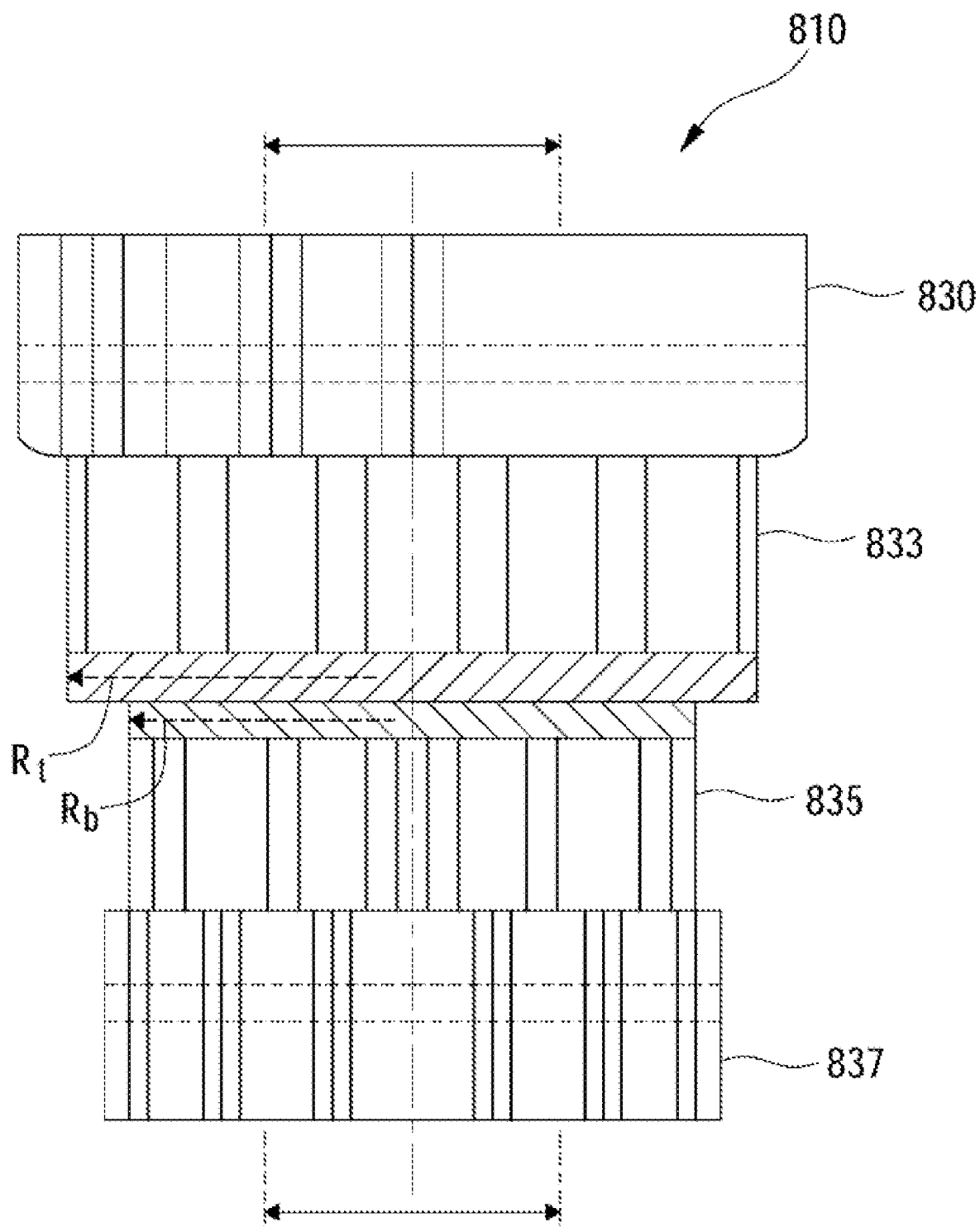
FIG. 11 shows a spur gear bearing planet module that includes half tooth gears.

FIG. 11 shows a spur gear bearing module generally designated as 810. The spur gear bearing module may include a core module (not shown), half gear tooth modules 830, 833, 835 and 837. These modules may be phase tuned with respect to each other in the same manner as the case for half tooth gear bearings. For spur gear forms, the output gear stage uses a top module of addendum spur gear teeth alternated with roller sections at the involute radius above dedendum spur gear teeth also alternated with roller sections at the common involute radius. These two modules may be placed axially above each other and angularly oriented to each other to place their roller sections exactly out of phase at their interface. This arrangement serves to form a spur half tooth gear bearing with proper gear action and continuous roller contact throughout the mesh process. As with herringbone gear forms, this approach may be followed for both the input and output stages of the spur planetary gear bearing forms.

Figure 12A:
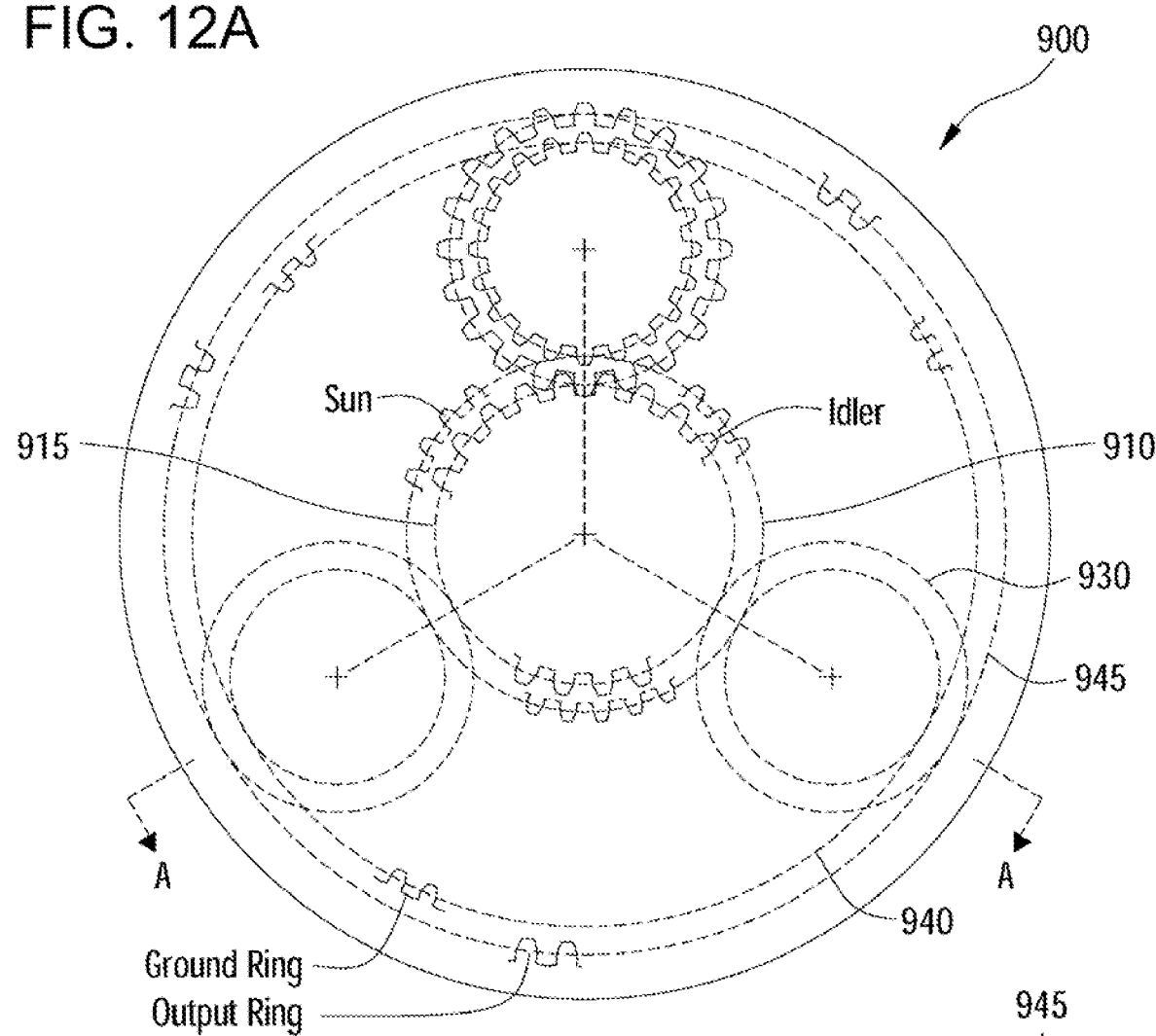
FIG. 12a shows a ground ring differential planetary gear system.
Figure 12B:
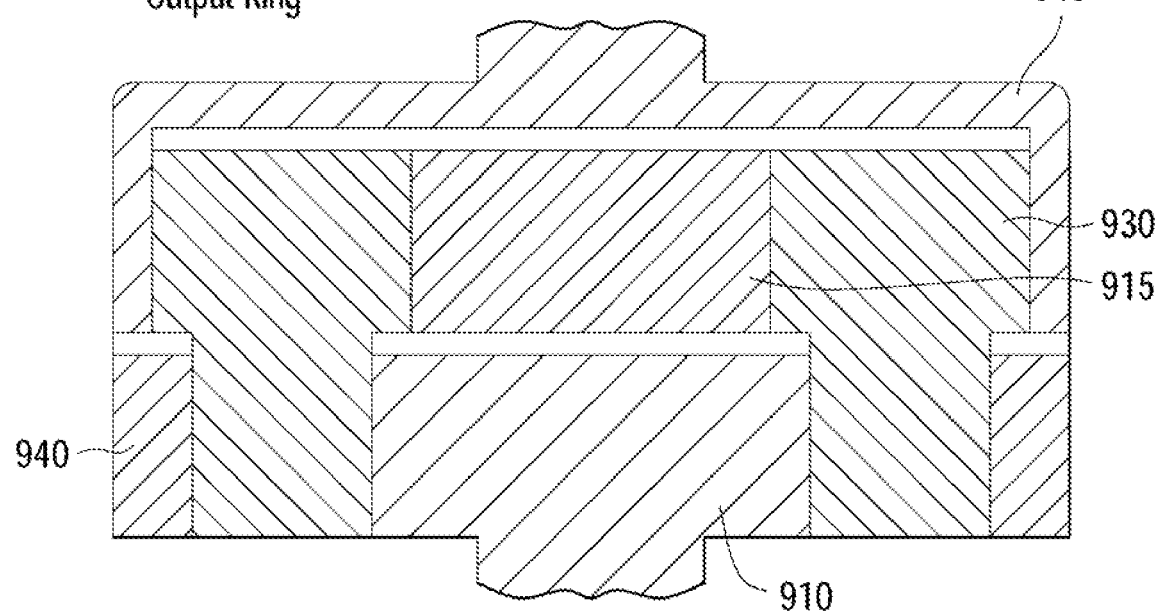

FIGS. 12a and b illustrate a ground ring planetary gearing system using modular gear bearings. The planetary gearing system, generally designated as 900 may include a sun gear bearing module 910, and idler 915, two stage planet gear bearing modules 930, ground ring gear bearing module 940 and an output ring gear bearing module 945.

Figure 13A:
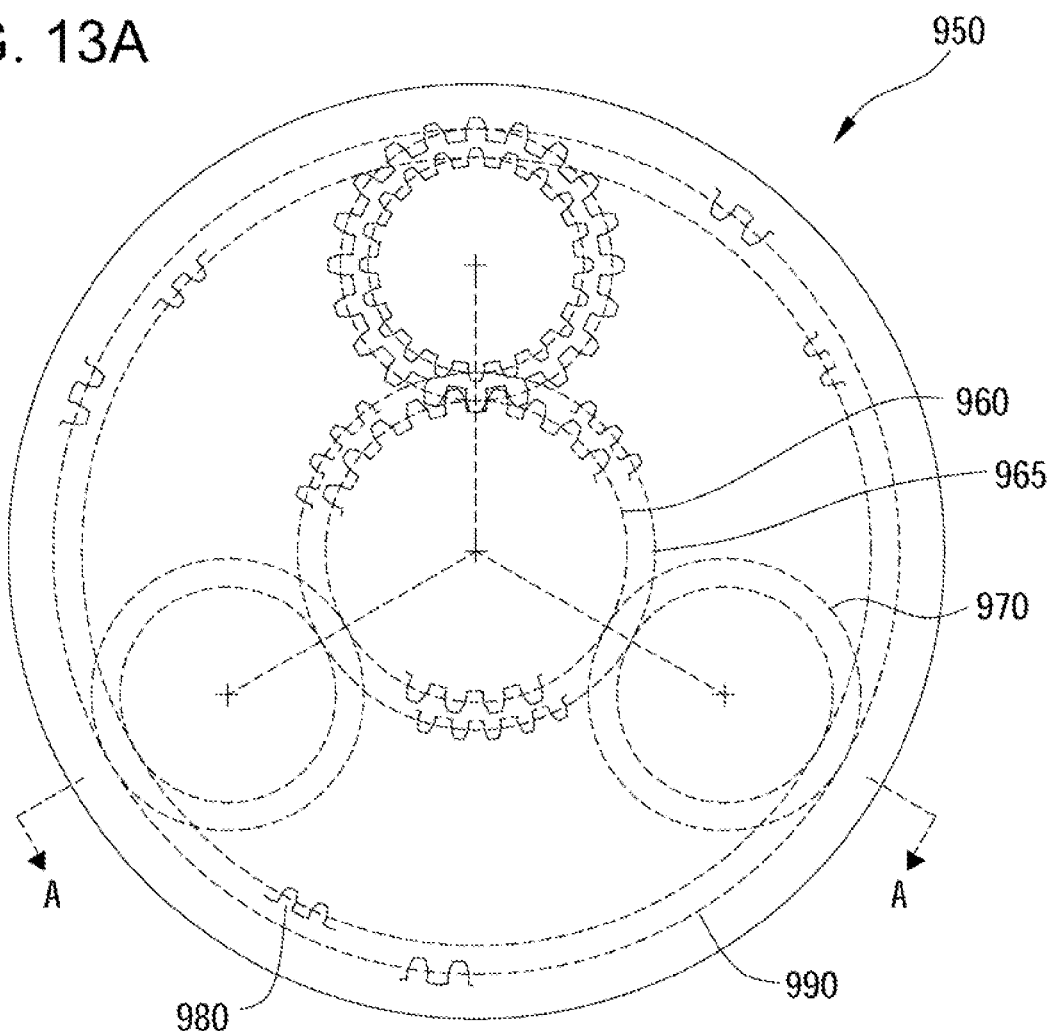
FIG. 13a shows a top view of a differential planetary gearing system with a grounded sun gear.
Figure 13B:
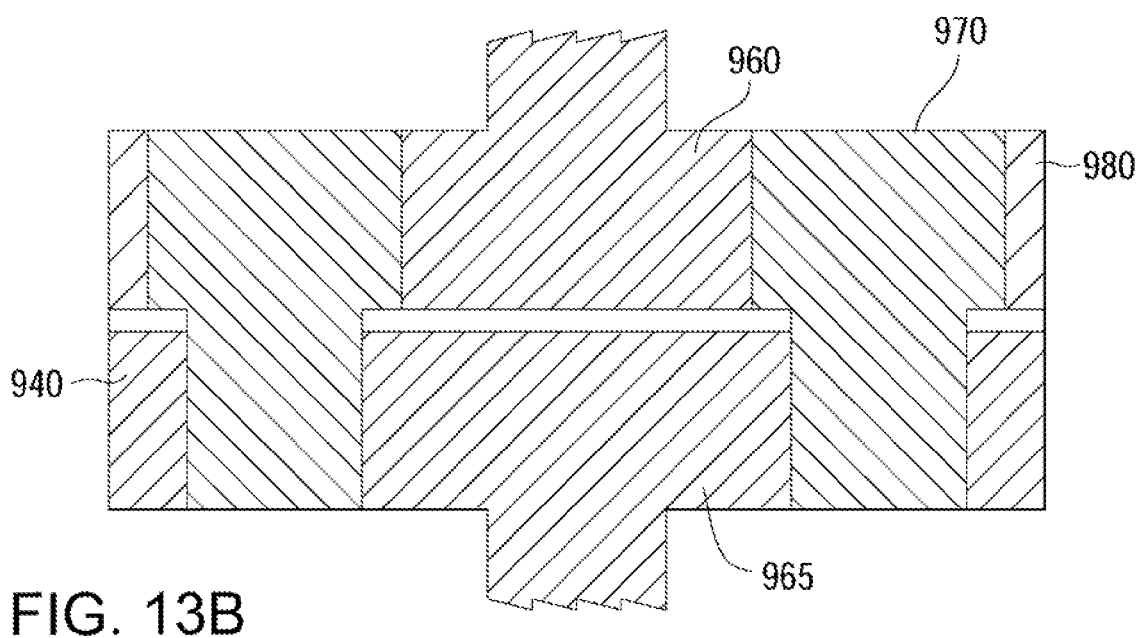

FIGS. 13a and b illustrate a ground sun planetary gearing system using modular gear bearings. The planetary gearing system, generally designated as 950 may include an output sun gear bearing module 960, ground sun gear bearing module 965, two stage planet gear bearing modules 970, idler ring 980 and input drive ring 990.

To those skilled in the art, many modifications and variations of the present invention are possible in light of the teachings contained herein. It is therefore to be understood that the present invention can be practiced otherwise than as specifically describe by these teachings and still be within the spirit and scope of the claims.

What is claimed is:

1. A gear bearing module comprising;
    a core module having a cutout portion;
    at least one roller module having a cutout portion;
    at least one gear module; and
    a fastening module inserted into said cutout portion of said at least one roller module and said core module so as to releasably attach said at least one roller module and said at least one gear module to said core module;
    wherein said core module is a biaxial core.

2. A gear bearing module according to claim 1 wherein said fastening module is selected from the group consisting of a spring fastener, a fastener clip or a spring clip.

3. A gear bearing module according to claim 1 wherein said fastening module biases said roller module against said gear module.

4. A gear bearing module according to claim 1 wherein said roller module includes a keyhole located approximately in the center of said roller module.

5. A gear bearing module according to claim 4 wherein said keyhole is a biaxial keyhole.

6. A gear bearing module according to claim 1 wherein said gear module includes a keyhole located approximately in the center of said gear module.

7. A gear bearing module according to claim 6 wherein said keyhole is a biaxial keyhole.

8. A gear bearing module according to claim 1 wherein said roller module and said gear module are substantially coaxially positioned with respect to said core module.

9. A gear bearing module according to claim 8 wherein said gear module is a sun gear.

10. A gear bearing module comprising:
    a core module having a cutout portion;
    a first roller module having a cutout portion;
    a first gear module; and
    a first fastening module inserted into said cutout portion of said first roller module and said core module so as to releasably attach said first roller module and said first gear module to said core module; wherein said core module is a biaxial core.

11. A gear bearing module according to claim 10 wherein said fastening module biases said roller module against said gear module.

12. A gear bearing module according to claim 10 wherein said first gear module and said first roller module are substantially coaxially positioned with respect to said core module.

13. A gear bearing module according to claim 10 further comprising a second gear module substantially coaxially positioned with respect to said core module.

14. A gear bearing module according to claim 13 further comprising a second roller module substantially coaxially positioned with respect to said core module.

15. A gear bearing module according to claim 13 wherein said second gear module is phase tuned with respect to said first gear module.

16. A gear bearing module according to claim 15 wherein said first and second gear modules are helical gears.

17. A gear bearing module according to claim 15 wherein said first and second gear modules are out of phase by one-half gear-tooth.

* * * * *